Feb. 20, 1962  C. ELLIS, JR  3,021,757
REFLECTOR DEVICE
Filed Sept. 16, 1958

INVENTOR.
CARLETON ELLIS, JR.
BY
his ATTORNEYS

United States Patent Office 3,021,757
Patented Feb. 20, 1962

3,021,757
REFLECTOR DEVICE
Carleton Ellis, Jr., 814 Hulls Farm Road,
Southport, Conn.
Filed Sept. 16, 1958, Ser. No. 761,368
4 Claims. (Cl. 88—98)

This invention relates to a reflector device and, more particularly, to a rear view mirror for a motor vehicle.

One of the chief difficulties encountered when using a reflector which is exposed to the weather is the problem of keeping the reflecting surface clean, and it is an object of this invention to provide a reflector device which includes a means for maintaining the reflecting surface free of rain.

This and other objects of the invention are accomplished by providing a reflector device comprising a mirror, a supporting stem for the mirror, a means to fasten the mirror to the supporting stem in a manner such that the mirror may be rotated with respect to the stem about an axis perpendicular to the reflecting surface of the mirror, and a plurality of vanes attached to the mirror about its periphery, so that movement of air through the vanes causes the mirror to rotate thereby to throw water off of the reflecting surface centrifugally.

This invention may be better understood from the following detailed description taken in conjunction with the accompanying figures of the drawings in which.

Figure 1:
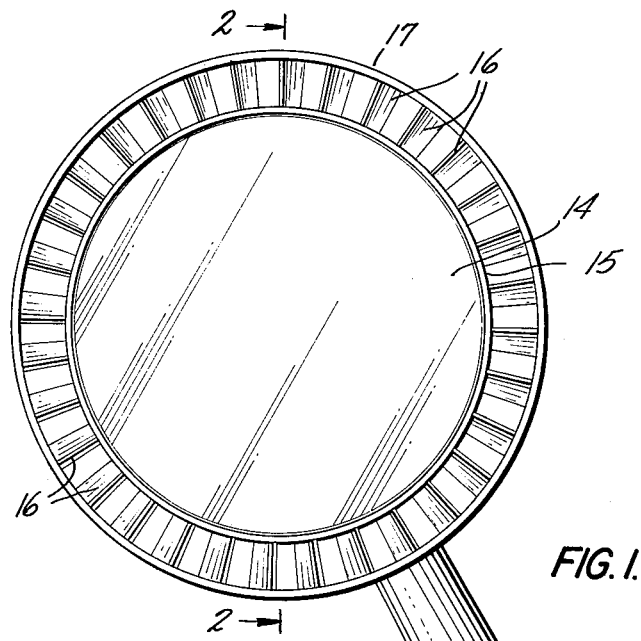
FIGURE 1 is a view in front elevation showing the reflector apparatus.

With reference to the drawings there is shown in FIGURE 1 a supporting stem 11 attached to a supporting surface 12, such as the cowling of an automobile, by means of screws. A mirror housing 15 attached to the stem contains a mirror 14 and is formed, at its periphery, with a plurality of vanes 16 enclosed within an outer ring 17. The surfaces of the vanes 16 are angularly displaced from a plane which is normal to the surface of the mirror 14, so that normal movement of air through the vanes causes the mirror to rotate about its axis.

Figure 2:
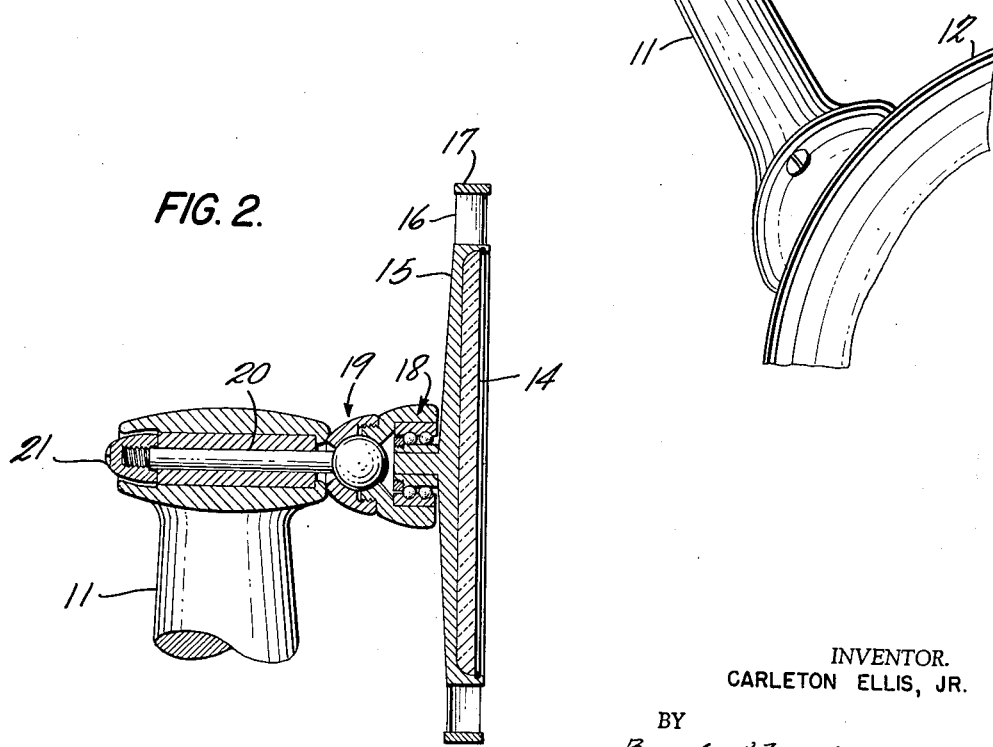
FIGURE 2 is a cross-sectional view taken along the plane 2—2 of FIGURE 1.

FIGURE 2 is a cross-sectional view showing the manner in which the mirror is mounted on the supporting stem. The mirror housing 15 is coupled to the stem 11 through a ball and socket joint 19 and a radial ball bearing 18. The inner race of the ball bearing is attached to an extension of the mirror housing and the outer race is attached to the socket at the ball and socket joint. The ball of the joint is attached to the stem 11 by the shaft 20 and nut 21. To adjust the position of the mirror 14, the nut 21 is loosened and the socket is rotated on the ball.

It can therefore be seen that the invention provides a novel and useful reflector device. When the reflector device is mounted on the outside of a motor vehicle, the movement of the air through the vanes 16 causes the mirror to rotate rapidly, thereby throwing the raindrops and other obscuring matter off centrifugally. The mirror does no require a power supply such as an electric motor but is driven simply by the movement of the car through the air or simply by the wind blowing through the vanes when the car is at a standstill. The reflector is therefore economical to operate, simple to build and reliable in operation.

While particular embodiments of the present invention have been shown and described, it is apparent that changes and modifications may be made without departing from this invention in its broader aspects. Therefore, the invention described herein is not to be construed as limited save as is consonant with the scope of the following claims.

I claim:

1. A reflector device comprising a mirror, a supporting stem, means to fasten said mirror to said stem in a manner such that said mirror may be rotated with respect to said stem about an axis perpendicular to the reflecting surface of said mirror, and a plurality of radially extending vanes attached to the periphery of said mirror to cause said mirror to rotate when air passes through said vanes in a direction which is substantially parallel to said axis of rotation of said mirror.

2. A reflector device comprising a mirror, a supporting stem, means to fasten said mirror to said stem in a manner such that said mirror may be rotated with respect to said stem about an axis perpendicular to the reflecting surface of said mirror and passing through the center of said mirror, and a plurality of radially extending vanes attached to the periphery of said mirror to cause said mirror to rotate when air passes through said vanes in a direction which is substantially parallel to said axis of rotation of said mirror.

3. A reflector device comprising a circular mirror, a supporting stem, means for fastening said mirror to said stem in a manner whereby said mirror may be rotated with respect to said stem about an axis passing through the center of said mirror and perpendicular to the reflecting surface of said mirror, and radially extending vanes attached to the periphery of said mirror and extending outwardly from said periphery to cause said mirror to rotate when air passes through said vanes in a direction which is substantially parallel to said axis of rotation of said mirror.

4. A reflector device comprising a circular mirror, a supporting stem, means for fastening said mirror to said stem in a manner whereby said mirror may be rotated with respect to said stem about an axis passing through the center of said mirror and perpendicular to the reflecting surface of said mirror, said fastening means comprising a set of ballbearings attached to a ball and socket joint, a plurality of radially extending vanes attached to the periphery of said mirror extending outwardly from said periphery to cause said mirror to rotate when air passes through said vanes in a direction which is substantially parallel to said axis of rotation of said mirror, and an outer annular ring attached to the outer edges of said vanes and containing said vanes against displacement caused by centrifugal forces, the width of said ring being that necessary to contain said vanes.

References Cited in the file of this patent

UNITED STATES PATENTS

| | | |
|---|---|---|
| 1,412,997 | Bonneau | Apr. 18, 1922 |
| 2,642,777 | Bradler | June 23, 1953 |
| 2,701,540 | Hamilton | Feb. 8, 1955 |
| 2,737,852 | Porter et al. | Mar. 13, 1956 |

FOREIGN PATENTS

| | | |
|---|---|---|
| 937,459 | Germany | Jan. 5, 1956 |